United States Patent
Foladare et al.

(10) Patent No.: US 10,193,837 B2
(45) Date of Patent: Jan. 29, 2019

(54) PRESENCE-BASED COMMUNICATIONS

(71) Applicant: AT&T INTELLECTUAL PROPERTY I, L.P., Atlanta, GA (US)

(72) Inventors: Mark Jeffrey Foladare, East Brunswick, NJ (US); Reuben Klein, East Brunswick, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 233 days.

(21) Appl. No.: 14/568,575

(22) Filed: Dec. 12, 2014

(65) Prior Publication Data

US 2016/0173430 A1   Jun. 16, 2016

(51) Int. Cl.
  *H04L 29/08* (2006.01)
  *H04L 29/06* (2006.01)
  *H04L 12/58* (2006.01)

(52) U.S. Cl.
  CPC ............ *H04L 51/12* (2013.01); *H04L 65/403* (2013.01); *H04L 67/02* (2013.01); *H04L 67/24* (2013.01); *H04L 67/26* (2013.01)

(58) Field of Classification Search
  CPC ....... H04L 51/12; H04L 65/403; H04L 67/26; H04L 67/02; H04L 67/24
  USPC ................ 709/206; 370/352; 705/27.1, 26.1, 705/14.53, 14.1, 26.81, 26.62
  See application file for complete search history.

(56) References Cited

U.S. PATENT DOCUMENTS

| | | | |
|---|---|---|---|
| 7,257,550 B2 | 8/2007 | Wilson, Jr. et al. | |
| 7,373,428 B1 * | 5/2008 | Armstrong | H04L 67/22 370/349 |
| 8,468,050 B2 * | 6/2013 | Faber | G06Q 30/02 705/14.1 |
| 2004/0128205 A1 | 7/2004 | Lanham et al. | |
| 2007/0294721 A1 * | 12/2007 | Haeuser | H04N 7/17318 725/34 |
| 2008/0086528 A1 * | 4/2008 | Garg | G06F 11/3495 709/204 |
| 2008/0126476 A1 * | 5/2008 | Nicholas | G06Q 10/10 709/203 |

(Continued)

FOREIGN PATENT DOCUMENTS

| CN | 101373533 | 2/2009 |
|---|---|---|
| CN | 103702062 | 4/2014 |

(Continued)

OTHER PUBLICATIONS

Labidi et al., "XMPP based Event Notification Middleware for Real-Time and Large Scale Health Care Integrated Ambient Systems", Ambient Intelligence Developments Conference, Sophia Antipolis France, 2007, pp. 1-6.

*Primary Examiner* — Aaron N Strange
(74) *Attorney, Agent, or Firm* — Greenblum & Bernstein, P.L.C.

(57) ABSTRACT

Information is presented over a communications network. The presence of a party on a device is detected in real time. Identity of the party is confirmed based on detecting the presence of the party on the device in real time. Information to offer to the party is identified based on confirming identity of the party. A communication is pushed to the party on the device as a push communication in real time while the party is still present on the device. The information is offered in the push communication while the party is still present on the device.

20 Claims, 12 Drawing Sheets

(56) References Cited

U.S. PATENT DOCUMENTS

| | | | | |
|---|---|---|---|---|
| 2008/0171559 | A1* | 7/2008 | Frank | G06Q 30/02 455/456.5 |
| 2009/0150551 | A1* | 6/2009 | Pagan | H04L 67/22 709/228 |
| 2010/0191604 | A1* | 7/2010 | Raleigh | G06Q 10/06375 705/16 |
| 2010/0287050 | A1* | 11/2010 | Jones | G06Q 30/02 705/14.58 |
| 2011/0295722 | A1* | 12/2011 | Reisman | G06Q 30/0201 705/27.1 |
| 2013/0085851 | A1 | 4/2013 | Pedro et al. | |
| 2013/0191198 | A1* | 7/2013 | Carlson | G06F 9/468 705/14.23 |
| 2013/0191213 | A1* | 7/2013 | Beck | G06Q 30/0267 705/14.53 |
| 2014/0044123 | A1* | 2/2014 | Lawson | H04L 65/1023 370/352 |
| 2014/0195380 | A1* | 7/2014 | Jamtgaard | H04L 67/22 705/26.61 |
| 2014/0344913 | A1* | 11/2014 | Stahl | H04L 12/1403 726/11 |
| 2015/0112826 | A1* | 4/2015 | Crutchfield, Jr. | G06Q 30/0601 705/26.1 |
| 2015/0127439 | A1* | 5/2015 | Campos De Figueiredo Faceira | G06Q 30/0222 705/14.16 |

FOREIGN PATENT DOCUMENTS

| | | |
|---|---|---|
| JP | 2001-265977 | 9/2001 |
| TW | 2011-001755 | 1/2011 |
| WO | 2013/108121 | 7/2013 |
| WO | 2014/118736 | 8/2014 |

\* cited by examiner

Computer**

Figure
4

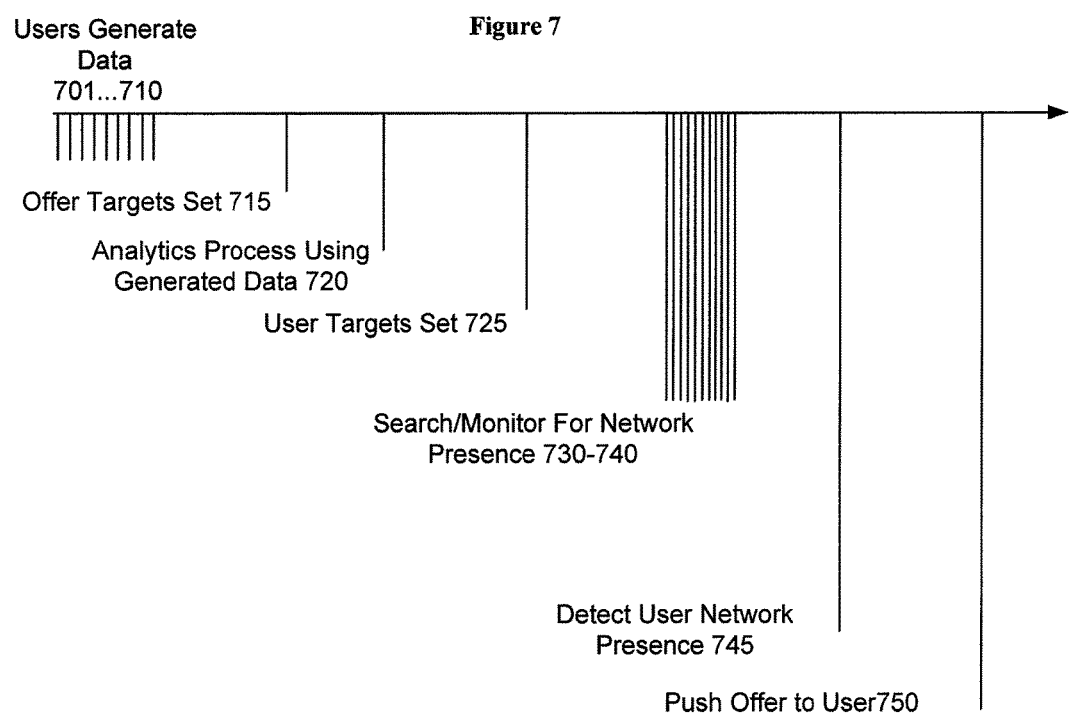

Figure 8

| Target ID | Device | Carrier | O/S | Applications | WiFi Check In? | Presentation |
|---|---|---|---|---|---|---|
| 1<br>Sally Q Public | A - Tablet<br><br>B - Phone | AT&T<br><br>Network #3 | OS X<br><br>Android | Social Network #3<br>Retailer #22<br>(None) | No | Brand #6 Shoes |
| 2<br>Jane Doe | - Phone | AT&T | Android | Social Network #1 | WF 2640 | Brand #2<br>Children's Clothes |
| 3<br>Betty Boop | A- Phone<br>B - Phone | Network #2<br>Network #2 | OS X<br>OS X | Retailer #4<br>Social Network #2<br>(None) | WF 6331<br><br>WF6331 | Brand #6 Shoes |
| 4<br>Pippi Longstocking | - Tablet | Network #6 | Android | Social Network #1<br>Social Network #3 | No | Brand #2<br>Children's Clothes |
| 5<br>Alexis Bonamy | A – Tablet<br><br>A- Tablet | AT&T<br><br>AT&T | OS X<br><br>Android | Retailer #2<br>Retailer #16<br>Social Network #1 | WF 1645<br><br>WF 9183 | Brand #6 Shoes |
| 6<br>Laura Bracke | - Phone | Network #3 | Android | (None) | No | Brand #6 Shoes |

PRESENCE-BASED COMMUNICATIONS

BACKGROUND

1. Field of the Disclosure

The present disclosure relates to the fields of networks and communications. More particularly, the present disclosure relates to the field of correlating presence on networks with communications capabilities.

2. Background Information

Network communications are traditionally initiated based on knowledge of destination communication addresses such as phone numbers and email addresses. Even when a calling party initiating a communication has little or no specific knowledge of a receiving party expected to receive the communication, such as with telemarketing calls and email spam, the communications are typically initiated based on lists of destination communication addresses. There have always been circumstances, particularly outside of network communications, where communications have been "initiated" without knowledge of receiving party, such as by approaching a potential customer in a physical location such as a store. However, when communication networks are involved, communications are traditionally initiated based on knowledge of at least the destination communication addresses, even if there is little or no specific knowledge of the parties expected to receive the communications.

BRIEF DESCRIPTION OF THE DRAWINGS

FIG. 7 shows a timeline of activity for presence-based communications, according to an aspect of the present disclosure;

FIG. 8 shows a target list for presence-based communications, according to an aspect of the present disclosure;

DETAILED DESCRIPTION

In view of the foregoing, the present disclosure, through one or more of its various aspects, embodiments and/or specific features or sub-components, is thus intended to bring out one or more of the advantages as specifically noted below.

Methods described herein are illustrative examples, and as such are not intended to require or imply that any particular process of any embodiment be performed in the order presented. Words such as "thereafter," "then," "next," etc. are not intended to limit the order of the processes, and these words are instead used to guide the reader through the description of the methods. Further, any reference to claim elements in the singular, for example, using the articles "a," "an" or "the", is not to be construed as limiting the element to the singular.

Figure 1:
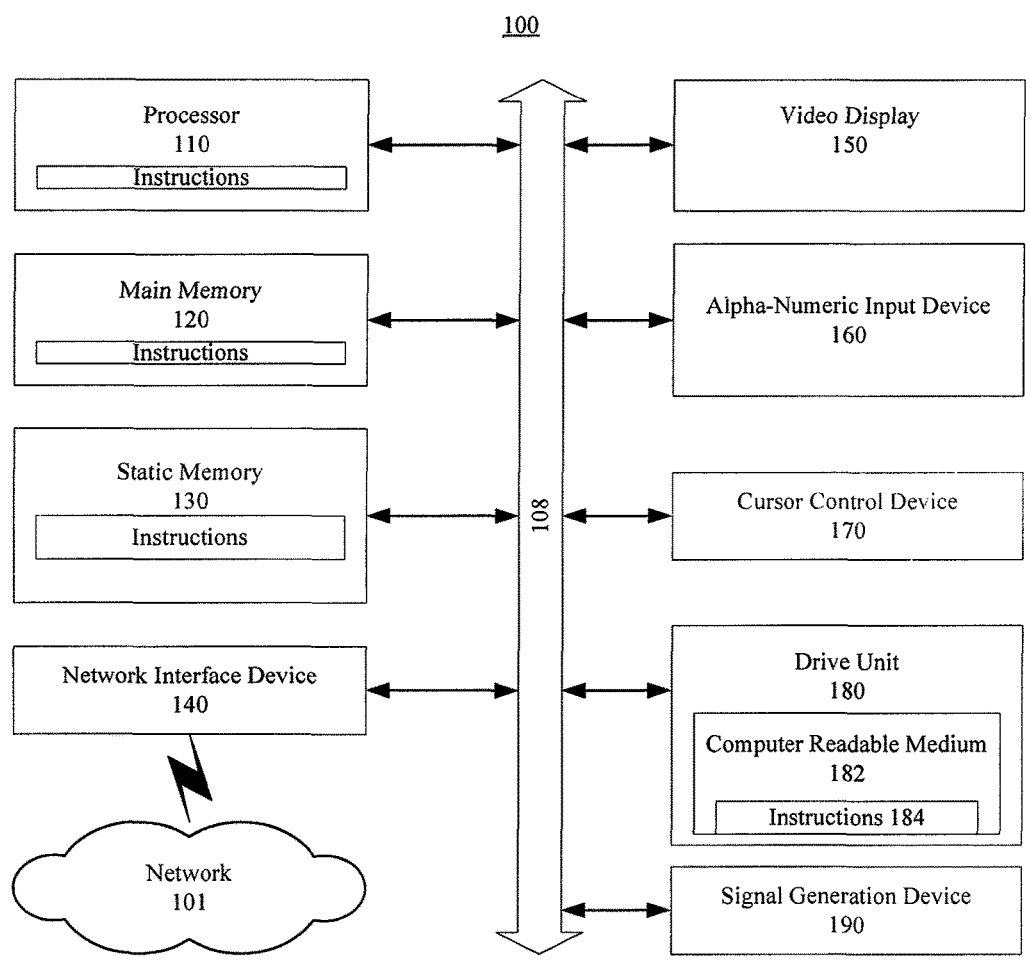
FIG. 1 shows an exemplary general computer system that includes a set of instructions for presence-based communications.

FIG. 1 is an illustrative embodiment of a general computer system, on which a method of presence-based communications can be implemented, and which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system 100 may operate in the capacity of a server or as a client user computer in a server-client user network environment, or as a peer computer system in a peer-to-peer (or distributed) network environment. The computer system 100 can also be implemented as or incorporated into various devices, such as a stationary computer, a mobile computer, a personal computer (PC), a laptop computer, a tablet computer, a wireless smart phone, a set-top (cable or IPTV) box (STB), a personal digital assistant (PDA), a global positioning satellite (GPS) device, a communications device, a control system, a web appliance, a network router, home router, switch or bridge, analytics system or server, presence system or server, ID system or server, or any other machine capable of executing a set of instructions (sequential or otherwise) that specify actions to be taken by that machine. The computer system 100 can be incorporated as or in a particular device that in turn is in an integrated system that includes additional devices. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 includes a processor 110. A processor for a computer system 100 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A processor is an article of manufacture and/or a machine component. A processor for a computer system 100 is configured to execute software instructions in order to perform functions as described in the various embodiments herein. A processor for a computer system 100 may be a general purpose processor or may be part of an application specific integrated circuit (ASIC). A processor for a computer system 100 may also be a microprocessor, a microcomputer, a processor chip, a controller, a microcontroller, a digital signal processor (DSP), a state machine, or a programmable logic device. A processor for a computer system 100 may also be a logical circuit, including a programmable gate array (PGA) such as a field programmable gate array (FPGA), or another type of circuit that includes discrete gate and/or transistor logic. A processor for a computer system 100 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the computer system 100 includes a main memory 120 and a static memory 130 that can communicate with each other via a bus 108. Memories described herein are tangible storage mediums that can store data and executable instructions, and are non-transitory during the time instructions are stored therein. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. A memory described herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted.

As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard/virtual keyboard or touch-sensitive input screen or speech input with speech recognition, and a cursor control device 170, such as a mouse or touch-sensitive input screen or pad. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. Sets of instructions 184 can be read from the computer-readable medium 182. Further, the instructions 184, when executed by a processor, can be used to perform one or more of the methods and processes as described herein. In a particular embodiment, the instructions 184 may reside completely, or at least partially, within the main memory 120, the static memory 130, and/or within the processor 110 during execution by the computer system 100.

In an alternative embodiment, dedicated hardware implementations, such as application-specific integrated circuits (ASICs), programmable logic arrays and other hardware components, can be constructed to implement one or more of the methods described herein. One or more embodiments described herein may implement functions using two or more specific interconnected hardware modules or devices with related control and data signals that can be communicated between and through the modules. Accordingly, me present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

The present disclosure contemplates a computer-readable medium 182 that includes instructions 184 or receives and executes instructions 184 responsive to a propagated signal; so that a device connected to a network 101 can communicate voice, video or data over the network 101. Further, the instructions 184 may be transmitted or received over the network 101 via the network interface device 140.

In a communications network, a party may communicate with another party or communicate with or navigate an automated destination such as a website or interactive voice response (IVR) system. The communications and navigation may also result in generation of data that can be monitored and used by other recipients. As described herein, this data is monitored in real-time, and can be used in real-time. The presence of a party can be detected by searching for data already automatically generated based on the communications or navigation.

Additionally, presence on a device can be determined when a browser is open on the device. According to the present disclosure, a "cookie" or other form of the presence-detecting software may be installed on the device, with either explicit or implied consent when required or appropriate. The software can be installed, for example, when the device is used to visit a website that automatically or permissively sends the software to the device. As is known, a cookie can be stored in a web browser on a device and then send data from the device back to a server when the browser is open on the device.

As described herein, the cookie or other presence-detecting software can send data that can be used to confirm presence of a user on the device. The device may be, for example, Web Real Time Communications (WebRTC) capable, so that a user on the device is able to communicate via a browser. The presence-detecting software may automatically send information to a predetermined internet address when the browser is open, so as to announce that the browser is open. As is known, a device may have more than one cookie or similar software, and each such piece of software may send different information and different kinds of information to different internet addresses. Other kinds of data recorded by a cookie may include browsing information such as which websites are visited by a user of a device, which controls (e.g., buttons, icons etc.) on a website are clicked by the user, and so on.

For the purposes of the present application, the cookie or similar software is used to send information back to a predetermined destination, such as a web server. As described herein, the web server can then provide a list of cookies, devices, users, etc., with open browsers in real time to an agent so that the agent can send a push message to users on the devices in order to initiate communications.

The real-time use of data resulting indirectly from previous web browsing or real-time network communications and directly from explicit navigation from, e.g., an open browser, is used herein to confirm presence of a party on a device. A predetermined list of parties can even be searched for on a communications network in order to detect presence. In this way, when a web server provides a set of cookies, devices, or available users, an agent system can search for the cookies, devices, or available users they seek. Once presence of a party on a device is detected in real-time, the party can be contacted via the device on which they are present.

The monitoring described herein may be performed comprehensively for all users of a communications network, of a particular type of communications device, of a particular operating system, of a particular application, or even of a particular communications node in or connected to the communications network. Alternatively, the monitoring may be performed selectively for specific users, particular devices, particular applications and/or particular operating systems. Selective monitoring of communications may be performed, for example, for a particular party that agrees to a particular type of monitoring.

Thus, when presence of a particular party is sought on a device, the data that is already generated can be searched and analyzed in real-time in the manner described herein to detect when the party is present on the device. The monitoring, searching and analysis described herein is performed by a third party, and not by the party, the other party or the automated destination. The presence of the party on the device can therefore be identified or detected by the communications network, or by a third-party system which receives data from the communications network, the device, the operating system, the application, or the network node in or connected to the communications network.

That is, according to the present disclosure, a communications network itself may recognize when a party is present on a device communicating on the communications network. The communications network already monitors, e.g., communications volumes, flows, destinations, times, such as for billing purposes. This data can be searched and analyzed in real-time to confirm when a particular party is present on a device.

Similarly, according to the present disclosure, a device, an operating system on the device, and/or an application on the device, may also already monitor communications and navigation involving the device, operating system or application. Indeed, a device, operating system or application may include instructions to monitor such communications and gather and send data describing such communications to a specified address as metadata. These instructions can be included with the device, operating system or application at the time the device, operating system or application is assembled or downloaded. Similar to the communications network, data already gathered by the device, operating system or application can be searched and analyzed real-time to recognize when a party is present on a device communicating on the communications network.

A search for presence can be performed for one or more particular parties. Thus, while voluminous data resulting from monitoring communications and navigation may already exist, the search for such data may be limited to data generated by one or more particular parties on devices on the communications network. In the present disclosure, the search may be performed across several different network providers, such as when a list of targets includes parties who may have service contracts with different communications service providers.

Further, in the present application, the presence of the party can be detected without the monitoring system interacting with or otherwise specifically notifying the party at the time of the monitoring. The party may have preauthorized the monitoring at the time the device was purchased, an application is installed, a service agreement for communications service is provided, or afterwards. Thus, the party may not be particularly aware that presence of the party has been detected at the time the presence is detected according to the present disclosure.

Presence can be detected in a variety of ways described herein. For example, presence can be detected by searching for data generated for the communications network based on communications involving a device. Such data for a communications network may include a volume or even rate of data sent to and/or from the device, and the type of data sent to and/or from the device. The data itself can include metadata describing the device, location of the device, applications used by the device, operating system used by the device, and data captured by the device.

Availability is not the same as presence, but can be assumed in some circumstances. A communications service provider may be able to detect when an individual is actively communicating on a personal communications device, but may assume the individual is not available when the individual is engaged in a telephone call. On the other hand, a communications service provider may be able to detect when an individual is browsing the internet, but assume that the individual is available even while browsing the internet.

As described herein, network identity can be used to determine physical presence and availability of an individual. The individual can be contacted in real time via a browser session in order to offer information to the individual. Network identity is the identity used to confirm an individual's access to a network, such as by being signed into an email or text service on a communications device, or by possessing a communications device (e.g., telephone, tablet, computer) assigned to the individual.

Figure 12:
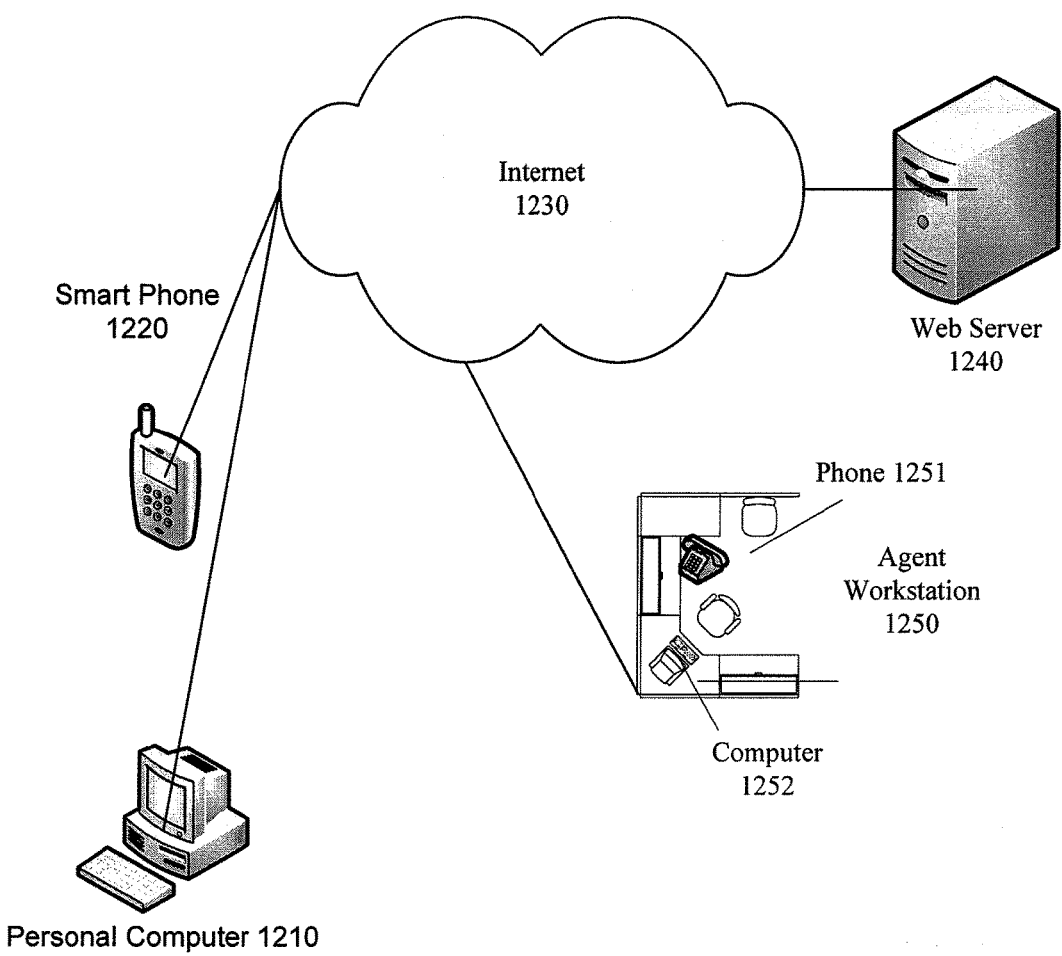
FIG. 12 shows another network for presence-based communications, according to an aspect of the present disclosure.

FIG. 12 shows an exemplary network for presence-based communications, according to an aspect of the present disclosure. In FIG. 12, a user's personal computer 1210 and/or smart phone 1220 are used to browse the internet 1230 using browsers. Websites visited by the user may be implemented by web server 1240. Web server 1240 sends cookies or other software that can be used to confirm when the user is present on the personal computer 1210 or smart phone 1220. The cookies or other presence-detecting software may send data to the web server 1240 when the user is on the smart phone 1220 or personal computer 1210 with an open browser.

The web server 1240 can then send a list of available users to an agent at agent workstation 1250 via the internet 1230. The agent workstation 1250 includes a phone 1251 and computer 1252, and the agent can send a push notification to the user via, for example, WebRTC using the user's open web browser on the smart phone 1220 or personal computer 1210.

The agent at the agent workstation 1250 may actually have more than one option for finding the user and communicating with the user. For example, presence information can be collected from multiple different sources, such as from multiple different sources that receive information from different cookies. Presence information can be obtained from, for example, social network websites/applications, or from operating system-based native applications that enable communications. The agent may be able to communicate with the user via WebRTC, a social network application, a phone call, or the operating system-based native applications.

As described further herein, WebRTC provides communications capabilities within a webpage, so that voice and video can be streamed via a webpage opened by/on a browser. WebRTC doesn't require a particular application installation, and is available on many WebRTC-capable devices and/or applications from the time they are purchased by a user. Using WebRTC or another communications mechanism selected by an agent, the agent can push a message to a user when the agent is notified that the user is available.

As should be clear, using WebRTC or application-based or operating system-based messages, an agent does not require a user's particular communication address such as a phone number or even email address or internet protocol (IP) address. Rather, the cookie or other software on the user device may provide the agent a unique ability to communicate with the user via the browser. An application-based or operating system-based messaging capability also provide the agent an ability to message the user without knowing a user's particular communication address. Thus, even if the WebRTC or other messaging capability uses communications addresses intrinsically to route messages and data between the agent and user, the agent does not need to use or even know the communications address in order to communicate with the user via the open browser or application. Rather, the agent can be fed other forms of identification as links from the web server 1240.

The present disclosure also describes other sources of presence information that can be used, including network carriers with the ability to detect when a device is being used for communication. In the various examples described herein, the agent can be fed contact lists to select from in order to initiate contacts for whatever purpose tasked to the agent.

Figure 2:
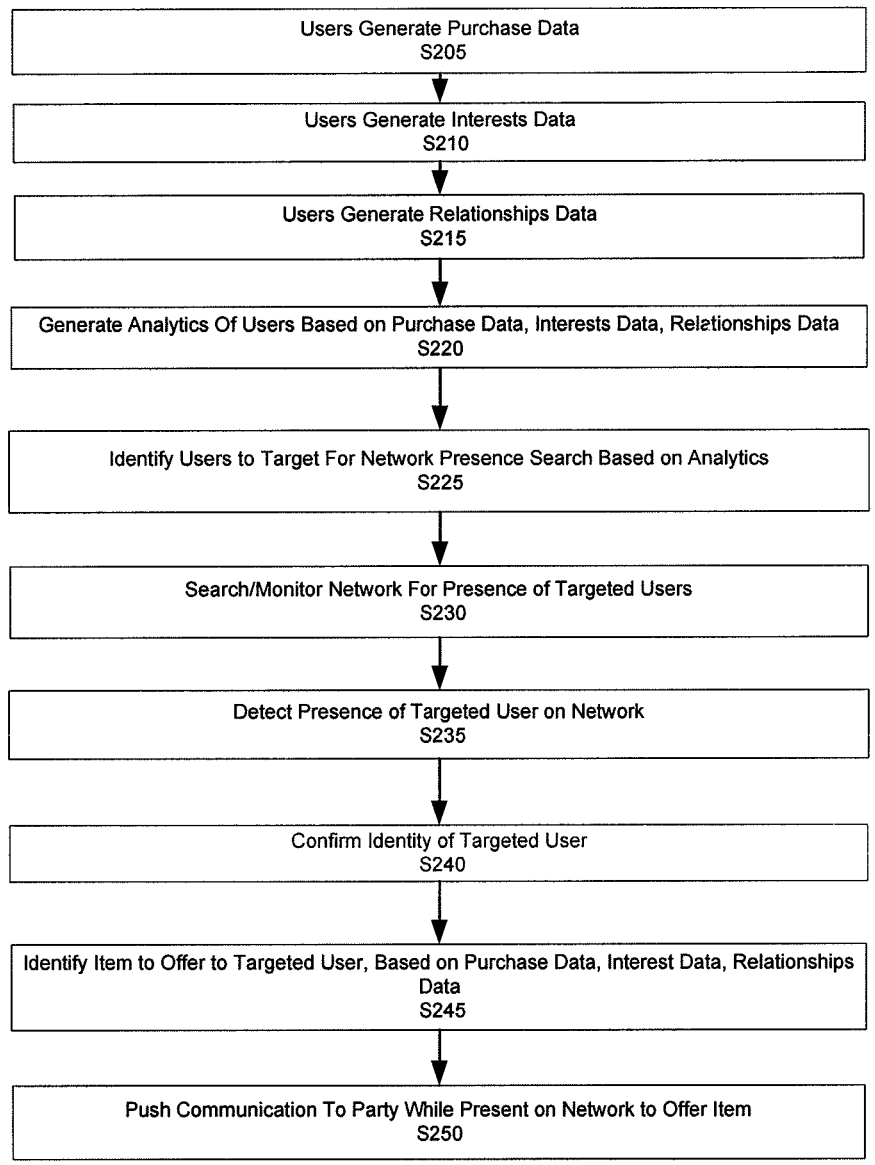
FIG. 2 shows a process for presence-based communications, according to an aspect of the present disclosure.

FIG. 2 shows a process for presence-based communications, according to an aspect of the present disclosure. In FIG. 2, users generate purchase data at S205. Purchase data is data representative of purchases made by the users, such as what the users purchase, where the purchases are made, how the users pay for the purchases, what the purchases cost, and so on. At S210, users generate interests data. Interests data can be any data reflective of interests of the users, from sign-in sheets at entertainment events to groups joined on an online social network. At S215, users generate relationships data. Relationships data is data reflective of other persons who have relationships with the user, and can include communications counterparties, social network contacts and friends, data provided to or by governments, and so on.

At S220, analytics of users are generated based on purchase data, interests data, and relationships data. Of course, the analytics of users can be run on other types of data obtained from other types of sources than those mentioned herein. The data can include so-called "Big Data" which generally refers to very large amounts of data such as the details derived by communications network providers from all communications. The analyzed data can include geo-location data, check-in data, tower data, time data, communications counterparty data including communications originating and destination addresses, and so on. The analyzed data can also include financial data, internal account data, data that is held as proprietary by a source that provides access to the analytics system, and so on.

At S225, users can be identified as targets for a network presence search based on the analytics. This targeting can be from users who have, for instance, visited a website and viewed a particular product or reviewed a particular question or other piece of content on the website. The targeting can also be from users who have passed through a particular physical store with devices that checked into, e.g., the store's free WiFi network.

The targeting can also be hybrid targeting that is not based purely on an automated analytics search, but instead is correlated with input from sales agents. For example, a salesman on a sales lot may obtain the name of a customer and note the time the customer visits. The data can be correlated with information registered by a WiFi system on the sales lot, so that the user's device can be contacted later by an agent with information that might be particularly relevant to the customer. Thus, the analytics data can be correlated with specific input from human agents such as sales representatives.

At S230, a network is searched or monitored for the presence of targeted users. Here a search may be by, for example, pinging a device believed to belong to a targeted user. Alternatively, a user's presence on a device may be detected by information from the network provider, an application on the device, from the operating system on the device, from a network accessed by the device, or from a third party that has information from an application, an operating system or a network. At S235, the presence of the targeted user is detected, such as by confirming that the targeted user is actively communicating on a social network application.

If the presence of a targeted user is detected, the identification of the targeted user can be confirmed in an identification check at S240. The confirmation may be by checking that the proper user is logged into a particular application being used on the device.

At S245, an item to offer to the targeted user is identified based on the purchase data, interests data and relationships data. The item identified for one targeted user may differ from an item to offer for another targeted user. For example, an agent may be assigned to sell a particular product identified from analytics, but may also be assigned to sell different products from a product line, or even different products from different product lines, based on the analytic results. The description contained herein is not limited to sales however. The description can be used for fundraising, organizing by political and religious and social institutions, and so on.

At S250, an agent pushes a communication to the targeted party while the targeted party is present on the network. The communication may be a text or other form of message passed by any messaging system identified on the device of the targeted party. The communication can also be, however, a WebRTC message passed from browser to browser so that the message appears on a browser session of the targeted user. The message may be, for example, an offer to discuss a particular product or service or other topic in a telephone call, video call, message exchange or so on.

Push communications are Internet-based communications initiated by (server) providers rather than (client) recipients. Push communications may be pre-authorized by a recipient in advance, either at the time of purchasing a communication device, signing up for a communication service, downloading a particular application, or when pre-authorization is required. Thus, a preauthorized push service may be analogous to a subscription, where the push communications are analogous to a subscription.

According to the present disclosure, the mechanism by which a push communication is provided may be newly installed on a communications device by a user in order to receive the specific push communications described herein. Alternatively, a mechanism may be pre-installed on a communications device, and the user may simply preauthorize push communications from a particular source in order to receive the information as a target as described herein.

WebRTC is one such mechanism that enables web browsers to provide real-time communications capabilities. WebRTC supports browser-to-browser applications for voice calling, video chat, and P2P file sharing. An agent can use WebRTC to initially send a chat message to a target through an open browser, and then follow up with a voice call, video chat etc. if the target agrees.

WebRTC is an API specification drafted by the World Wide Web Consortium (W3C). WebRTC can allow a web browser to capture media on a user device by accessing a camera and microphone. WebRTC also has a function that allows a web browser to set up audio and video calls. WebRTC can set up audio and video calls. WebRTC also allows a browser to share data via peer-to-peer. Communications are coordinated via a signaling channel which can be provided by a script in a page via a server.

WebRTC may also be enabled by an applet installed on a targeted user's device by a user. The applet can create a WebRTC "peer connection" which allows opening of a media stream to the browser of the targeted user. The applet itself can be installed as a selection on a website such as "click here if you would like to install an add on". Once installed, the website will be able to find you when you are online. Alternatively, existing push notifications can be used, though these also may require preauthorization from a targeted user. As another alternative, an applet used to enable WebRTC communications may come with a device when purchased by a targeted user. The applet may also be offered for installation in exchange for a reduced service price, or a rebate or other financial incentive.

Although not belabored, targeted users may have to provide preauthorization to receive push communications as described herein. Targeted users may, for example, agree to receive push communications when they provide information to a particular website or when they install a particular application on their user device.

Figure 3:
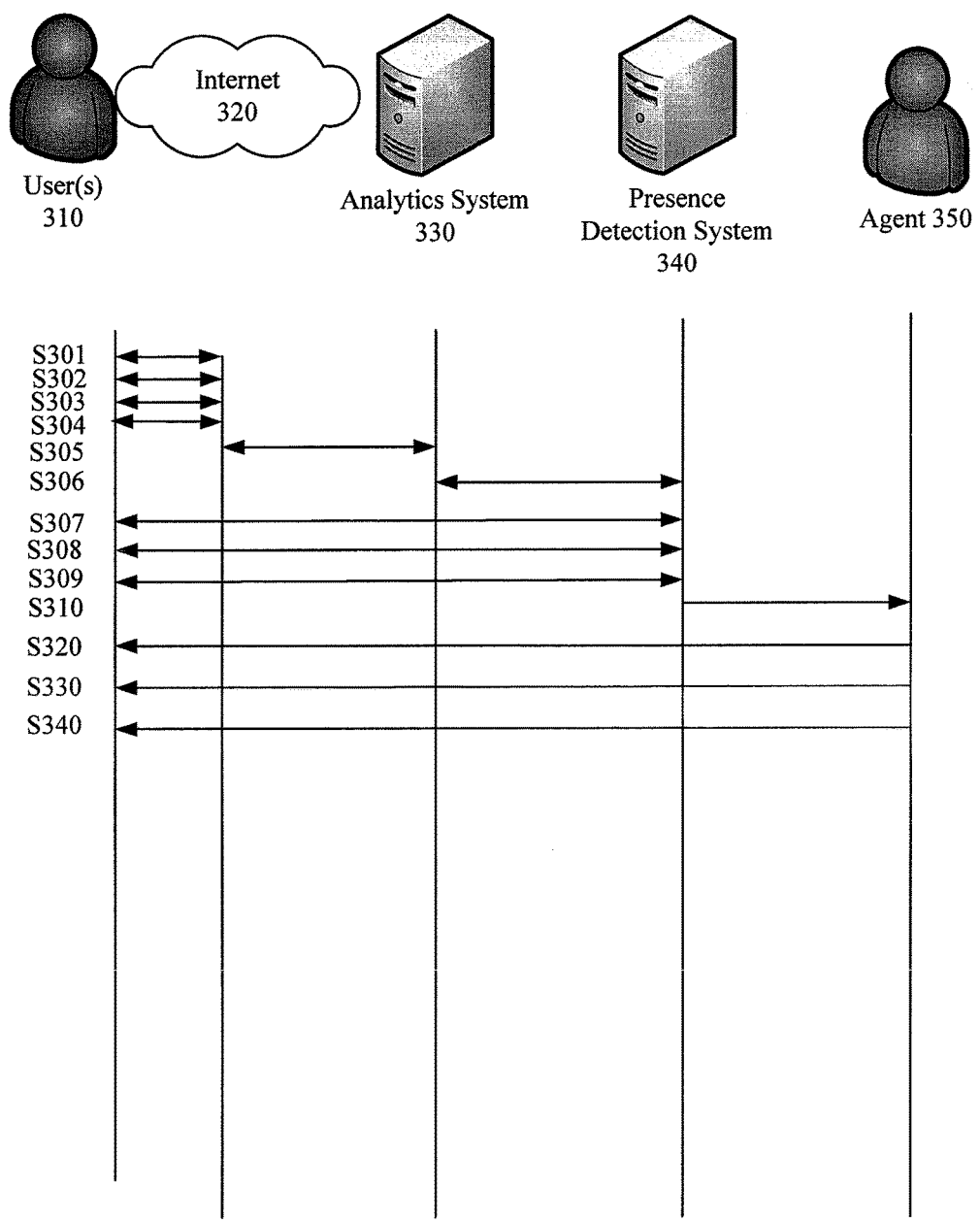
FIG. 3 shows a communication flow for presence-based communications, according to an aspect of the present disclosure.

FIG. 3 shows a communication flow for presence-based communications, according to an aspect of the present disclosure. In FIG. 3, users 310 communicate over the internet at S301 to S304. At S305 an analytics system 330 analyzes the internet activity from S301 to S304 and notifies presence detection system 340 at S306 of which users to target in a search on a network. At S307 to S309 the presence detection system checks presence of users 310 on devices on the network, and at S310 notifies an agent 350 of which users 310 are available At S320, S330 and S340, the agent 350 tries to contact the users 310 via, e.g., via push texts over open browsers on user devices of the users 310.

Figure 4:
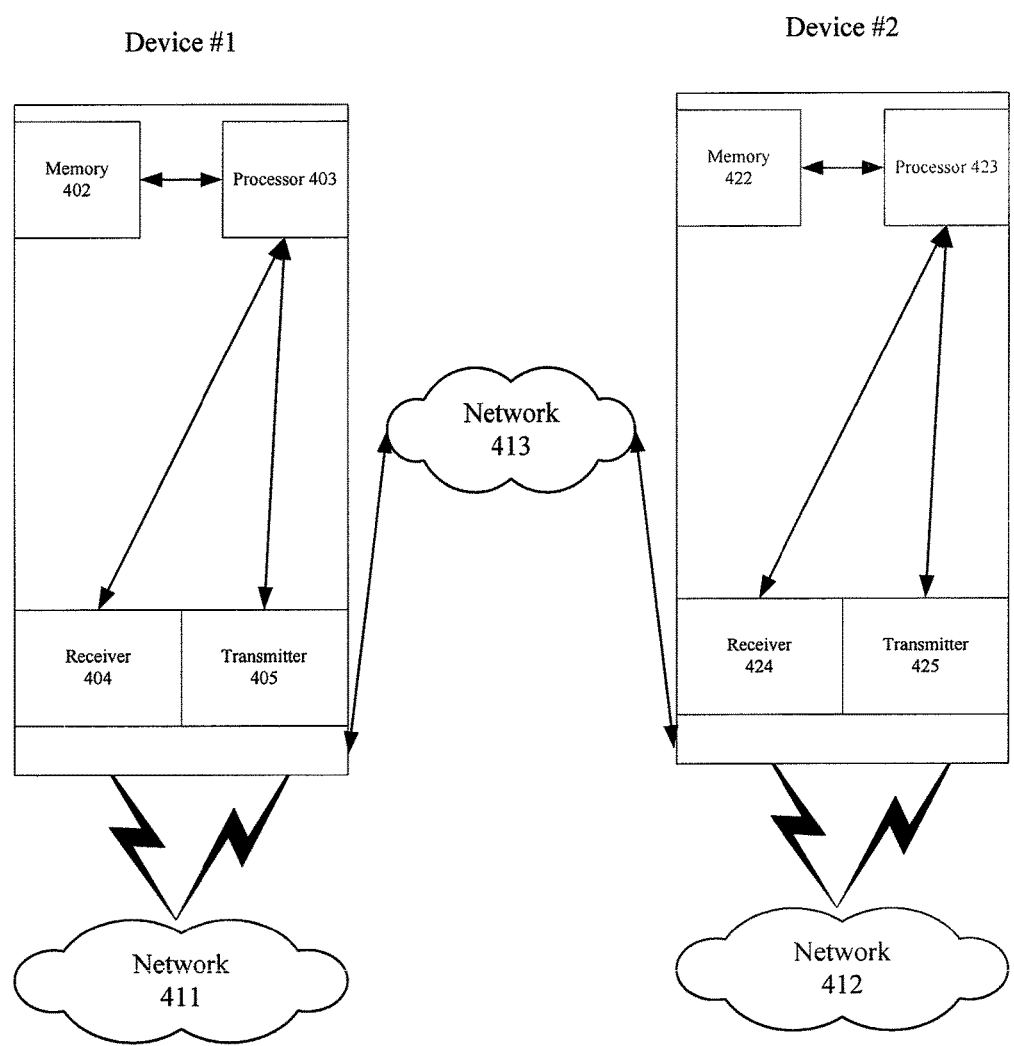
FIG. 4 shows interoperable devices used in presence-based communications, according to an aspect of the present disclosure.

FIG. 4 shows interoperable devices used in presence-based communications, according to an aspect of the present disclosure. In FIG. 4, two interoperable devices each include memory, processors, receivers and transmitters. Each of the interoperable devices also communicates across the same or different communications networks 411 and 412.

Device #1 includes a memory 402 that stores instructions executed by processor 403. A receiver 404 receives communications and a transmitter sends communications. Device #2 includes a memory 422 that stores instructions executed by processor 423. A receiver 424 receives communications and a transmitter 425 sends communications. Device #1 and device #2 can communicate with each other over network 413.

In FIG. 4, the interoperable devices #1 and #2 may be a presence system in a network and a user device. The presence system monitors and detects presence and even availability of a user on the user device. The interoperable devices #1 and #2 may also be a presence system and an ID confirmation system, where the presence system checks for presence and availability of a user and the ID confirmation system checks to confirm the identity of the user as an intended target.

In FIG. 4, device #1 and device #2 can interoperate without specific step-by-step instructions from an operator or agent. As explained herein, an analytics system can analyze Big Data of, for example, visitors to a website or customer care portal operated on behalf of a company. The analytics system can identify visitors who might benefit from a call from an agent at an outbound call center. The analytics system can automatically identify users who might benefit from a call, such as by their IP address, any log-in information or transaction information provided by the user, and so on. The analytics system can then task a presence system automatically to identify a user's user device and track the user's availability on a network. When available, an agent at an outbound call center can be automatically provided information of the user and the reason to call the user via, for example, a list of present users. In this way, an automated list of targets can be provided to an agent, along with additional information as described herein, and the agents can push a communication to the users when the users are available.

The entire process can be automated from up through the agent initiating the push communication to the user, and even this can be automated by automatically pushing messages to users when agents are available and then either concurrently or afterwards assigning the available agent to the user. In this way, a process of identifying targets, identifying presence and availability of targets, and of initiating contact with targets, can be automated using interoperable devices as shown in FIG. 4.

Figure 5:
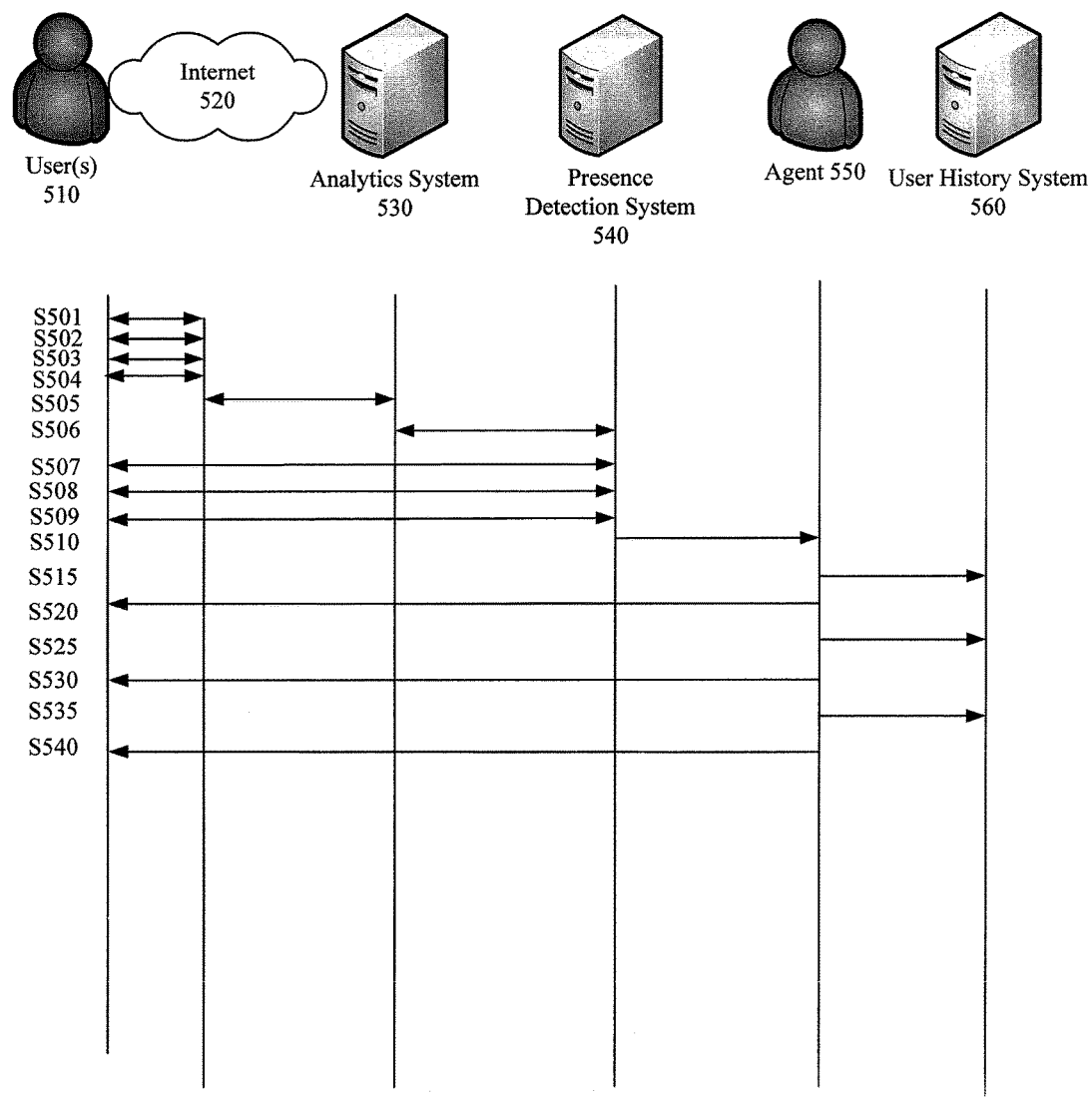
FIG. 5 shows a communication flow for presence-based communications, according to an aspect of the present disclosure.

FIG. 5 shows a communication flow for presence-based communications, according to an aspect of the present disclosure. In FIG. 5, user(s) 510 use the internet at S501, S502, S503 and S504. At S505, an analytics system 530 analyzes the use of the internet to correlate users(s) 510 with different content and interests expressed by the users in their use of the internet at S501, S502, S503 and S504. At S506, a presence detection system 540 receives instructions from the analytics system 530 to check for presence of certain users 510.

At S507, S508, S509 the presence detection system 540 checks whether the users are present on a user device. The presence detection system 540 may check whether a user is using a particular application, whether a user is sending or receiving texts, is on a phone call, is browsing the internet, and so on. When the presence detection system 540 determines that the user is present and available, the presence detection system advises agent 550, and agent 550 contacts the user history system 560 to obtain information about the user at S515 before contacting a user at S520.

The processes at S515 and S520 show the agent 550 checking information for a particular user on the user history system 560, and then contacting the user. The same process occurs for another user at S525 and S530, and for yet another user at S535 and S540. In these processes, the agent 550 can push a communication to the user. The communication can be a WebRTC communication pushed via a browser to the user, based upon a determination that a user is on the user device with an open browser.

Figure 6:
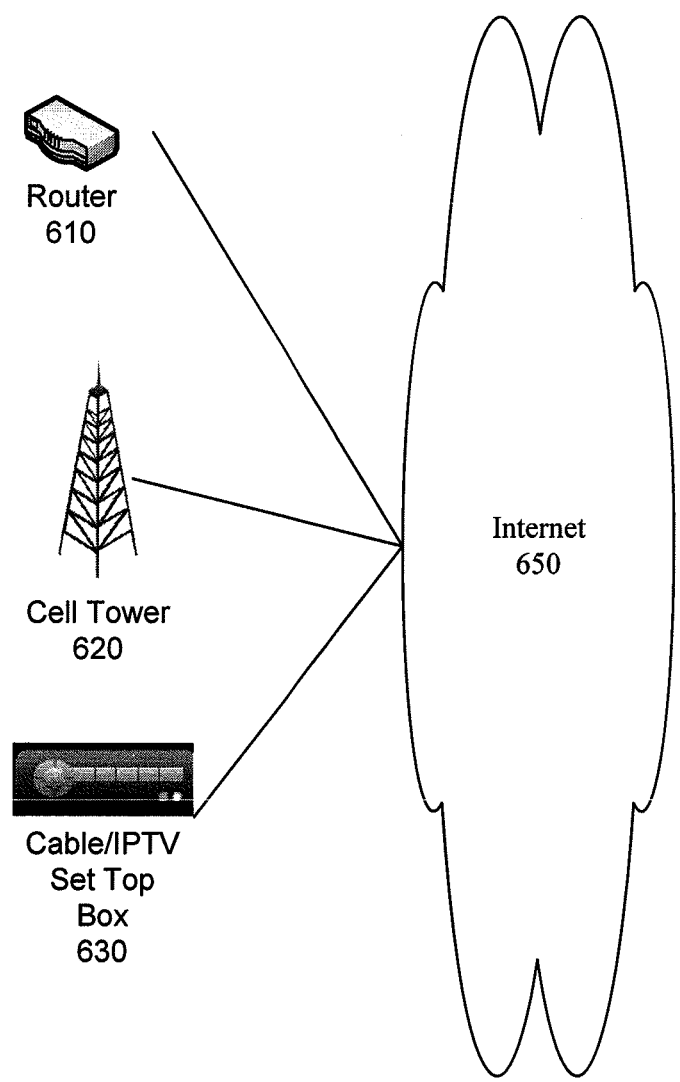
FIG. 6 shows a network for presence-based communications, according to an aspect of the present disclosure.

FIG. 6 shows a network for presence-based communications, according to an aspect of the present disclosure. In FIG. 6, the internet 650 is shown connected to a router 610, a cell tower 620 and a cable/IPTV set top box 630. In FIG. 6, communications and content sent and received by any of the router 610, cell tower 620 and cable/IPTV set top box 630 can be carried across the internet 650. As a result, the provider of the internet 650, such as an internet service provider, can access voluminous data about the presence and availability of such a user. The presence and availability data may be accessible for all users who use the internet 650, and the actual detection of presence is performed selectively for a selected subset of users. Similarly, as described herein, mobile network providers such as a provider for a smart phone or wireless tablet can also collect information from which presence and availability information can be derived.

FIG. 7 shows a timeline of activity for presence-based communications, according to an aspect of the present disclosure. In FIG. 7, 701-710 are background activities where users go about their everyday lives shopping, visiting websites, socializing, and communicating. Any of these can involve activities from which data can be generated and correlated with the users. Such data can include demographic information about the users, but can also involve identification of interests expressed by the users.

At 715, offer targets are set. An offer target is set by a sponsor such as a merchant or political campaign or social organization. The offers are analogous to telemarketing calls made over the legacy public switched telephone network (PSTN). However, in the context of the present application, offers can be correlated to particular targets, the presence of the targets, and the availability of the targets. At 720, an analytics process uses the data generated at 701-710 to generate data about the users and their interests. At 725, the analytics data is correlated with specific offer targets in order to generate a target list. At 730-740, targets on the target list are searched or monitored on a network for presence and availability. At 745, a user's presence is detected on the network. At 750, an offer is pushed to the user.

In FIG. 7, ten time points 701-710 indicate data generation from activities by users. However, as explained herein, users may constantly generate data in communications networks, in shopping habits, in social and religious and educational institutions, and so on. Collecting and analyzing such voluminous data as a general matter is well known, though some forms of data are propriety to particular service providers and not made available to others for collection or analysis.

One form of such data that can be used herein is Big Data from communications involving users in a communications network. Such communications networks can collect geo-location data from user devices and network nodes such as cell towers and WiFi hotspots, as well as communication information such as call, text and email metadata for communications carried across the communications networks. In this way, the Big Data collected by a communications network can include information about locations and communications and internet conduct by the users.

Similarly, network providers have an ability to monitor not just particular applications on communications devices, but any use of the communications devices in receiving and transmitting data. As described herein, however, a variety of entities can receive data from a single user device, as providers of applications, an operating system, the device itself, a network used by the device, and an access point accessed by the device, and so on. Such different entities can even work together to identify and confirm presence and availability of a user on a user device.

FIG. 8 shows a target list for presence-based communications, according to an aspect of the present disclosure. In FIG. 8, the target list includes six different users 1 to 6. Devices for each user are listed in the same column, with notes for when a user has multiple communications devices, and the type of communications device. The third column on the list provides the carriers/network providers for each communications device. The fourth column on the list provides operating system for each communications device. The fifth column lists open applications on each communications device. The sixth column lists whether each communications device is checked into a WiFi hotspot, and identification of the WiFi hotspot if checked in. The final column in FIG. 8 lists presentation information correlated to the target users based on their previous behavior and expressions of interest.

In FIG. 8, a list can be provided to an agent at an outbound call center automatically. The list can even be refreshed and updated to show updates for applications open in column 5, updates for WiFi check-in information in column 6, and so on. The list can be refreshed or updated to add or remove targets, such as when a target has become absent or unavailable, or when a target has been contacted already. The list may also include links to explanations of the presentation information, so that an agent who is tasked with selling brand #6 shoes can obtain and forward images and expanded information about brand #6 shoes to the identified target.

Figure 9:
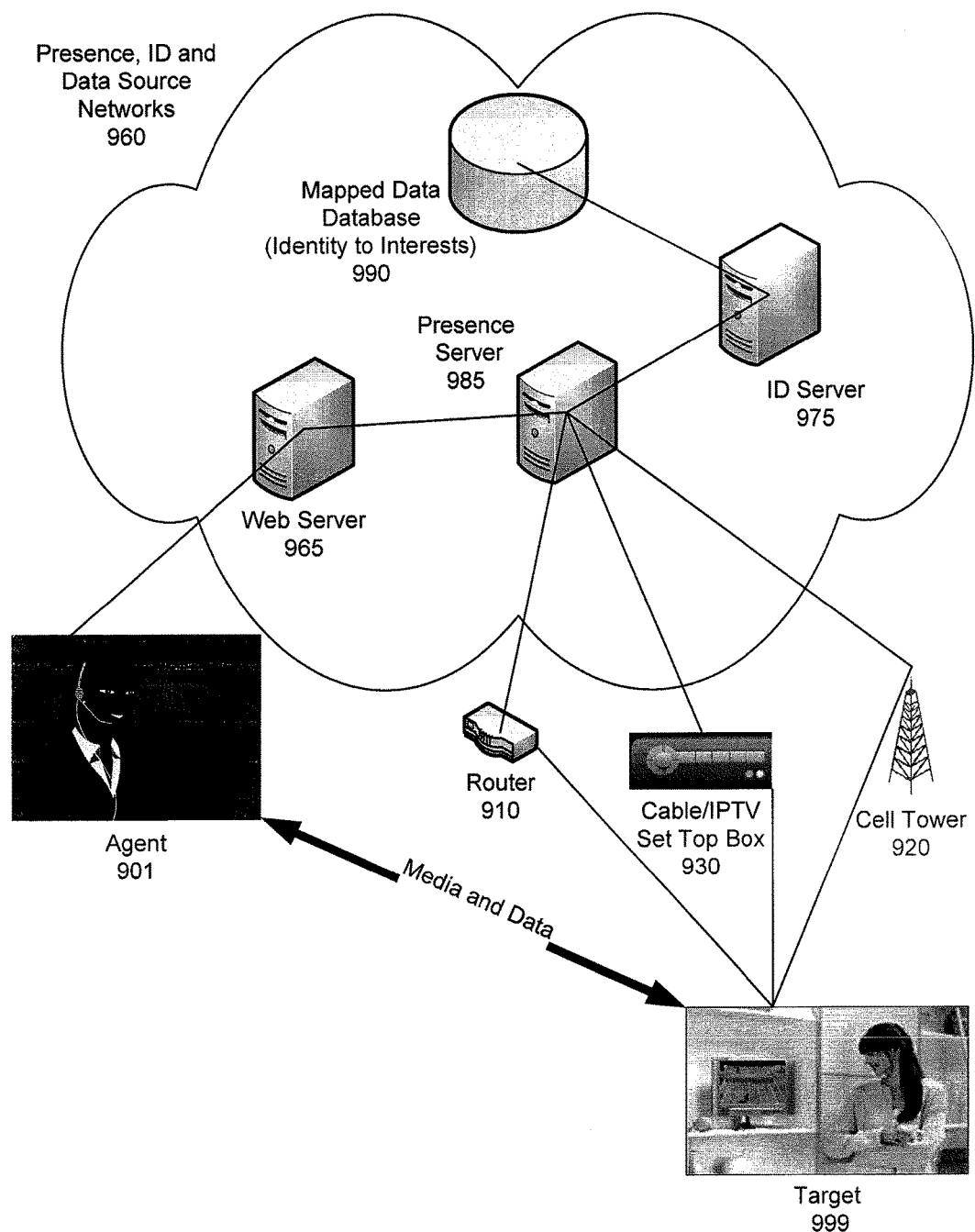
FIG. 9 shows a network for presence-based communications, according to an aspect of the present disclosure.

FIG. 9 shows a network for presence-based communications, according to an aspect of the present disclosure. In FIG. 9, an agent 901 is representative of an outbound call center agent, but may be any type of agent who wishes to initiate communications based on presence and confirmed identification information as described herein. In FIG. 9, the agent 901 receives a list of present targets including target 9 ss from a presence, ID and data source network 960. The presence, ID and data source network 960 receives presence and confirmed identification information from a target 999's user device(s). The presence and confirmed identification information can be obtained via devices connected to a cellular network (cell tower 920), and/or a cable or internet television network (cable/IPTV set top box 930), and/or the internet including a local WiFi network (router 910). User devices connected to any of these networks can provide information used to determine presence of the target 999, as well as to confirm identification of the target 999.

Moreover, while the user devices may provide useful information such as interests of the target 999, such information can also be provided from Big Data analytics analyzed as described already. The Big Data analytics may be analytics of a user's online search history at retail or social networking websites, or a user's purchase history, or history of viewing television shows or movies, or history of a user's locations identified from geo-location information, and so on.

The useful information such as interests of the target 999 can also be specific information, such as information obtained when the target visits a car dealership and expresses specific interest in a specific automobile. The car dealership may provide free WiFi that registers the target 999's user device when the user device requests access to the internet using the free WiFi, and the car dealership may be able to match the user device with the target 999. In this way, the car dealership can follow up with the target 999 later when an agent working for the car dealership wants to advise the target 999 that the model viewed by the user is, for example, on sale, or available, or in-stock etc.

In the embodiment of FIG. 9, the presence, ID and data source networks 960 include a variety of different servers and databases that are merely representative of one or more systems that can be used to provide the information described herein from a single party. As set forth, the single party can be an application provider, an operating system provider, a network provider, a device manufacturer, or even a third party aggregator of information from one or more of these providers and manufacturers.

The networks 960 in FIG. 9 include a mapped data database 990 which maps identity of targets to their interests. The mapped data database 990 can store information obtained directly from the target 999 by the presence, ID and data source networks 960. This information can include Big Data information, such as geo-location information of places visited by the target 999, communications times and counterparties for communications involving the target 999 using a user device, and even browsing history of browsers installed on the target 999's user device. The mapped data database 990 can also store information obtained from external sources, such as shopping habits or expressions of particular interests in different subjects, products, entertainment etc.

An identification server 975 is used to confirm identity of a target 999 on a user device. The identification server 975 may have information specific to the target 999, and try to confirm that the target 999 is the user present on a user device. Thus, the identification server 975 may check that a person signed into a social networking application being used on the user device is the target 999 who normally uses the user device. The identification server 975 may also check to confirm that other log-ins match the expected identity of the target 999 with the person present on the user device.

Presence server 985 is used to monitor activity on the user device so as to determine when the target 999 is present and available on the user device, or even just likely to be present and available on the user device. As described herein, presence may be determined up to a threshold likelihood, and may involve checking to be sure that a user device is being used, but not used too much or in certain ways. For example, an agent 901 may wish to push a communication to the target 999 if the target 999 is on a user device using the internet via a browser, but not if the target 999 is involved in a telephone call, or in a voluminous text messaging session, or in series of rapid moves between websites. As described previously, the push communications may require installation of a particular mechanism on the user device, such as WebRTC. The presence of the target 999 may be detected based on a search for the target 999 via such a mechanism on a communication device used by the target 999.

The web server 965 is used to communicate information to the agent 901. In the disclosure herein, the web server 965 can provide lists of targets that include the target 999, and mapped data for each target. The web server 965 can even provide different interests for different targets 999. In an example, an agent 901 may be tasked with selling different products to different present targets on a single list, based on identification of different interests for the different targets, and based on confirmation of presence and identify of the different targets on communications devices.

Figure 10:
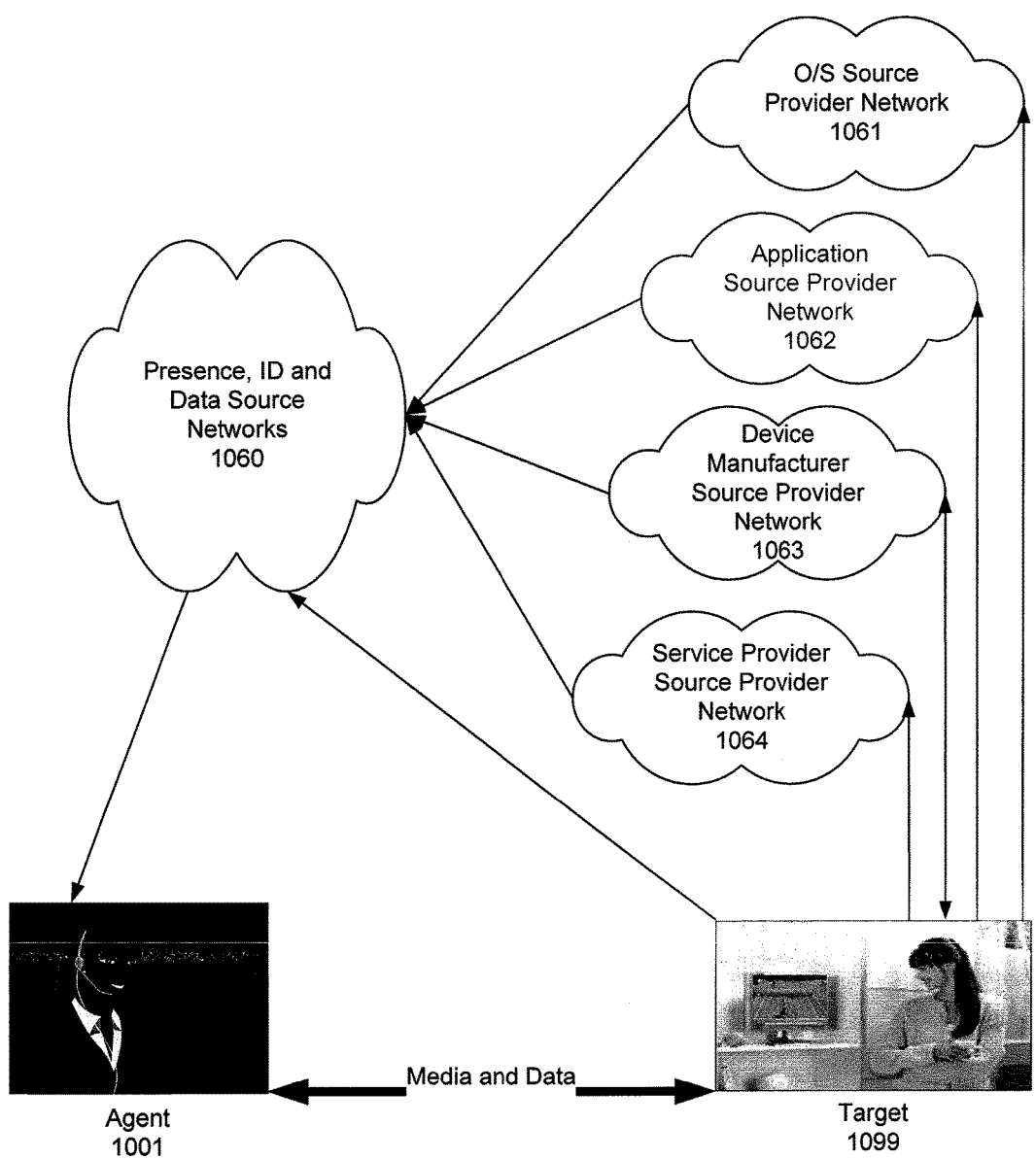
FIG. 10 shows a network architecture for presence-based communications, according to an aspect of the present disclosure.

FIG. 10 shows a network architecture for presence-based communications, according to an aspect of the present disclosure. In FIG. 10, an agent 1001 receives presence, ID and data information for targets before sending a push communication such as a WebRTC message to target 1099. In FIG. 10, the presence, ID and data information can be provided from a presence, ID and data source network 1060, which can be representative of a network carrier, an application provider, a device manufacturer, an operating system provider, and so on. That is, as described herein, presence information for a particular device and user can be obtained from a variety of sources. In turn, a source such as presence, ID and data source networks 1060 can receive information from others of the sources. This is shown in FIG. 10 where the target 1099 is providing information to each of the service provider source provider network 1064, the device manufacturer source provider network 1063, the application source provider network 1062, and the operating system (O/S) source provider network 1061. In FIG. 10, the service provider source provider network 1064 provides network access to one or more communications devices used by the user, and provides source information about the user to the presence, ID and data source networks 1060. The device manufacturer source provider network 1063 is the manufacturer of one or more devices used by the user, and provides source information about the user to the presence, ID and data source networks 1060. The application source provider network 1062 is the source of one or more applications installed on a device used by the user, and provides source information about the user to the presence, ID and data source networks 1060. The O/S source provider network 1061 is the source of the operating system on one or more devices used by the user, and provides source information about the user to the presence, ID and data source networks 1060.

Each of the source provider networks 1061-1064 are secondary sources to the presence, ID and data source network 1060. That is, as is shown in FIG. 10, multiple different entities may be providing information about a user from a single device. Devices as set forth herein include smart phones, tablets, laptops, desktops, interactive smart televisions, and other devices used by a user. In FIG. 10, the information provided to the agent 1001 is provided as a mechanism to advise the agent 1001 when the target 1099 is present, when the identity of the target is confirmed, and information about the target 1099. When the target 1099 is available and the identity of the target 1099 is confirmed, the agent 1001 can push a communication to the target 1099 with information that may be of interest to the target 1099. As set forth herein, the push communication can be a WebRTC message sent across an open browser on a user device used by the target 1099. The initial push communication may be a simple introductory message asking the target 1099 if the target 1099 is still interested in an object viewed by the target at a physical or online retail establishment. The initial push communication can also be a message of another sort, such as a political message, a social message from a religious or community organization or messages from other types of sources that use agents 1001 to contact targets. If the target 1099 agrees, the agent 1001 can exchange media and data with the target via WebRTC and/or, for instance, a message exchange, emails, a phone call across a cellular network or the internet, and even a video call. The agent 1001 can even exchange messages using applications on the target 1099s's device, such as a social network application's messaging application, or via a messaging application provided with an operating system on the target 1099's user device(s).

Figure 11:
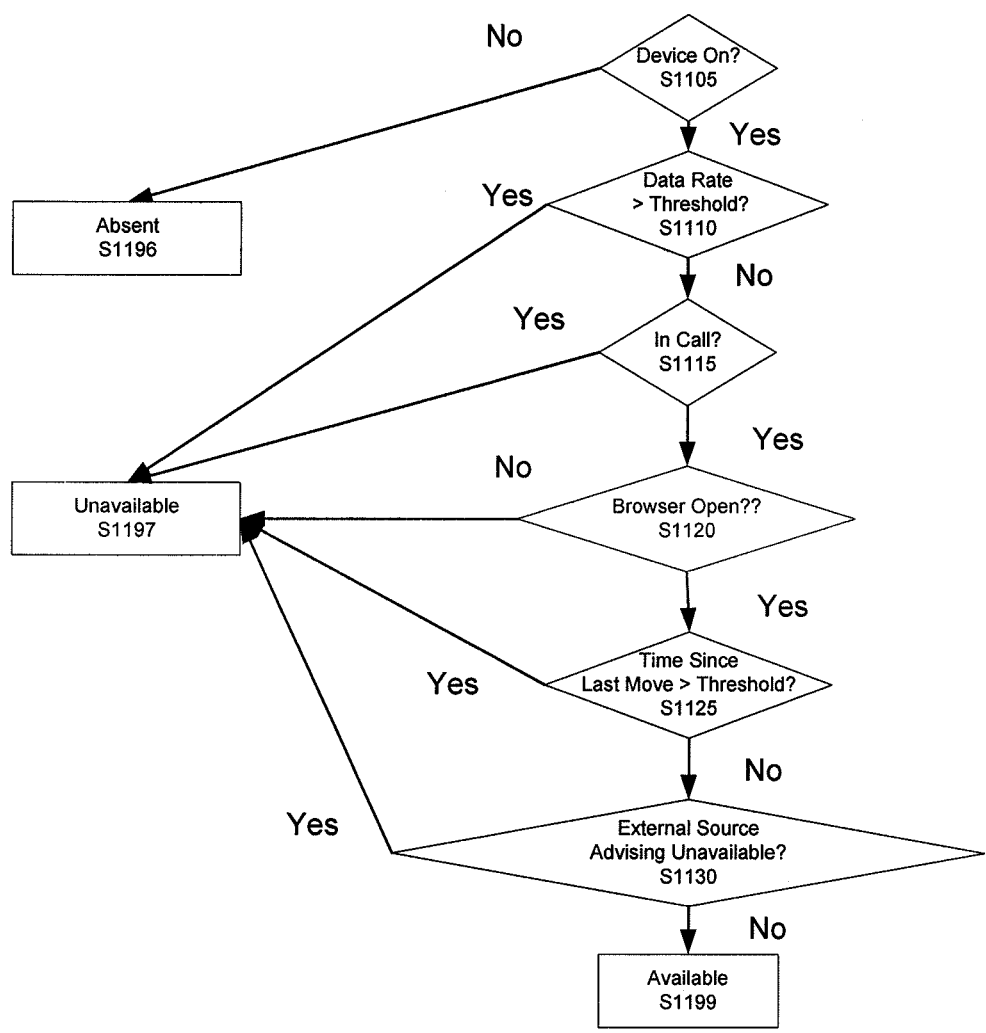
FIG. 11 shows another process for presence-based communications, according to an aspect of the present disclosure.

FIG. 11 shows another process for presence-based communications, according to an aspect of the present disclosure. In FIG. 11, a network provider such as a wireless or internet carrier analyzes a device that communications across the network in order to determine if the user of the device is absent, available or unavailable. Network providers may have unique access to data on and from the device, and may be in the best position to determine whether the user of the device is available.

At S1105, a determination is made as to whether the device is on. The determination at S1105 may be made by checking whether any communication data is being sent to or from the device. The determination at S1105 may be made by directly pinging the device in the network to see if the device responds. The determination at S1105 may be made by checking internal network data to see when the device last communicated by a call or text or email that is carried across the network. If the device is not on at S1105 (S1105=No), the user is determined to be "absent" at S1196. Thus, the user is either not identified as a target to, e.g., an outbound call center agent, or the user is identified but with a note that the user is absent.

At S1110, a determination is made as to whether a data rate is above a threshold. While a data rate is specified at S1110, the check here may actually use other metrics such as the frequency of communications, number of open applications or windows, or other types of information that would indicate that the user is very busy. When a data rate or other metric is used, the threshold may be preset the same for all users, or may be customized based on demographic information known about the user. For example, an older person may be considered busy and unavailable when they have sent or received 1 text message in the a three minute period, whereas a younger person may be considered available even if they have sent 9 text messages in a one minute period. The data rate or other metric(s) can thus indicate that the user is very busy, such as when the user is sending 10 and receiving 10 text messages per minute, or has 3 applications open and is communicating via message functions in all 3. In any event, if the data rate or other metric exceeds a threshold at S1110 (S1110=Yes), the user is deemed unavailable.

At S1115, a determination is made as to whether the user is involved in a call. This determination may be made by a wireless cellular network provider or by an internet service provider. A call may be a cellular telephone call or another type of call such as an internet telephone or video call. The determination again may involve checking whether a particular type of data is crossing the carrier's network. The data indicating a call is in progress may come from network nodes such as cellular towers, or from updated records such as billing records etc. In any event, if the user is on a call at S1115 (S1115=Yes), the user is deemed unavailable.

At S1120, a check is made as to whether a browser is open. This check at S1120 may be by checking the type or source of data that is crossing a network. The check at S1120 may also be by simply asking the device is a browser is open. The check at S1120 may also be a check of website visits by the device, such as if the user has visited a website in the last 30 or 60 seconds. The check at S1120 is made so as to determine if a WebRTC push communication can be made to the user via an open browser, so if a browser is not open at S1120 (S1120=No), the user is deemed unavailable.

Another check made at S1125 is to whether the user has moved in a predetermined period. The check may be, for example, whether geo-location data such as GPS or tower data shows the user has moved in the last 30 minutes, or the last 3 hours, or the last 7 hours. This check can be used to determine if the device has been set aside, such as when a user may be sleeping. This check at S1125 may be tied to particular hours, such as night time hours, or work hours. In this way, a user who is expected to be at work or at sleep may be deemed unavailable if there device has stayed in one location for longer than a preset threshold amount of time. If the time since the last move is greater than a threshold (S1125=Yes), the user is deemed unavailable.

Finally, at S1130, a carrier can check with external sources, such as application providers, to see if they have information as to the specific unavailability of a user. For example, a network carrier can check with a social network application provider to see if the social network application provider has information suggesting that the user is active on the social network. In this way, a user may be identified as unavailable when, for example, the user is using another communications device to access the social network application, or when the application data is protected from the network carrier. External sources at S1130 can include application providers, such as social network or online retail application providers. External sources at S1130 can also include WiFi providers, other network carriers, operating system providers, and so on. Additionally, the checks at S1130 may be specific checks from the carrier to the external sources, or may be checks of a clearinghouse by which sources with knowledge of users can provide information as to user availability. If an external source advises of a user's unavailability at S1130, the user is listed as unavailable at S1197. However, if the check at S1130 and all previous checks indicate that the user is not unavailable (i.e., is available), the process at S1199 determines that the user is available at S1199.

Once confirmed available at S1199, the user can be automatically listed as available to an agent at an outbound call center. Once listed as available, the agent can send a push WebRTC communication to the user's device via an open browser.

As described herein a network infrastructure can be used for outbound call centers. As an example, sales representatives can identify likely purchaser. The sales representatives can reach the likely purchasers via multimedia "calls" based upon knowledge of who the customer is, their interest in a product, and their availability. The customer can be reached without knowledge of the customer's phone number or other form of communications address such as an email address.

Although presence-based communication has been described with reference to several exemplary embodiments, it is understood that the words that have been used are words of description and illustration, rather than words of limitation. Changes may be made within the purview of the appended claims, as presently stated and as amended, without departing from the scope and spirit of presence-based communications in its aspects. Although presence-based communications has been described with reference to particular means, materials and embodiments, presence-based communications is not intended to be limited to the particulars disclosed; rather prensence-based communications extends to all functionally equivalent structures, methods, and uses such as are within the scope of the appended claims.

For example, presence-based communications can be implemented in a contact or call center, whether at a single location or distributed. Agents at the call center may obtain a list of identities who might be interested in a particular product. The agent can log on, and receive information of matched potential customers who are logged on with communications devices as described herein. The information can be provided as a list of target customers, devices of the target customers, applications on the devices from which information can be provided, network carriers that provide information of the target customers, and so on. An automated feed can feed information of target customers to an agent, and the agent can send an automated chat to a customer asking if the customer is willing to discuss particular product. As described herein, the product and solicitation may not be unfamiliar to the customer, such as when the product is a product viewed by the customer at a retail store or viewed online by the customer at an online store. The chat may ask the target customer if the target customer is willing to accept a free call from the agent to discuss the product.

As noted, the chat can be pushed via a WebRTC browser, and need not be tied to a phone number or email address. Identity information that can be used to locate and communicate with a targeted user can be as simple as the user's name and a "logged on" status, or other forms of presence information. Network identity information can be from a cell phone tracked by a carrier, a phone number, social network identification, online retail store account presence, and so on. The information can indicate where the targeted user is, that the device of the targeted user is on, and so on.

Additionally, the information can be obtained from a cookie downloaded to a user device when the user device is used to access a particular website or communicate via a particular network (carrier or local/WiFi). The cookie can then feed the information back to an internet-based presence server or system, and ultimately notify an agent of the targeted user's availability on a device with an open browser.

From the agent's perspective, the agent can get a list of targeted users without having a phone number or email address of the targeted users. The agent may be provided with a link to initiate a browser chat session with each targeted user, along with information of the targeted user's device, interests etc. Indeed, the texts from agents can be automated, so that outbound calls are automatically generated to targeted users who agree to take a call, and then queued for agents. In this case the first time a human agent is necessarily involved in the process might be when a call is initiated after a targeted user is identified with a confirmed presence, and agrees to take a phone or video call.

As described a variety of sources and even types of sources can provide presence information. The types of sources include network carriers, providers of local wireless networks, operating systems providers, device providers, application providers including retailers and social networks, and more. Information that can be presented to targets can be derived from Big Data analytics or from specific information such as specific visits to a physical or online retail location. However, the Big Data analytics may be used to identify lists of targets likely to be specifically interested in the same information (e.g., product). WebRTC can be used to create a real-time session between the agent and the target across the internet once the agent identifies the target and the target's availability. The agent can then follow up via chat, voice or video in any order if a target is interested in the communication.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. Such standards are periodically superseded by more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

According to an aspect of the present disclosure, a method of presenting information over a communications network includes detecting the presence of a party on a device in real time. Identity of the party is confirmed based on detecting the presence of the party on the device in real time. Information to offer to the party is identified based on confirming identity of the party. A communication is pushed to the party on the device as a push communication in real time while the party is still present on the device. The information in the push communication is offered while the party is still present on the device.

According to another aspect of the present disclosure, an analytic result of analyzing behaviors of a plurality of parties including the party is obtained in order to identify the party as a target to search for presence on the device. The presence of the party is detected using web real time communication independent of any communication address of the party.

According to still another aspect of the present disclosure, the information is for an item to offer for sale to the party and the item is identified after confirming identity of the party.

According to yet another aspect of the present disclosure, the presence on the device is determined by presence on a wireless communications network by a provider of the wireless communications network.

According to another aspect of the present disclosure, the presence on the device is determined by presence on an application installed on behalf of the party on the device.

According to still another aspect of the present disclosure, the presence on the device is determined by an operating system of the device.

According to yet another aspect of the present disclosure, the presence on the device is determined by a communications system that intermediates a local wireless network with a wired broadband network.

According to another aspect of the present disclosure, the communication is pushed to the device using web real time communications.

According to still another aspect of the present disclosure, the communication is pushed to the device through a browser session on the device.

According to yet another aspect of the present disclosure, the browser session is open on the device before the party is detected on the device.

According to another aspect of the present disclosure, the presence of the party is detected on the device based on the browser session being open.

According to still another aspect of the present disclosure, the method includes obtaining pre-approval from the party to push the communication to the party before detecting the presence of the party on the device.

According to yet another aspect of the present disclosure, the method includes obtaining a list of parties, including the party, who have presence detected in real time on devices.

According to another aspect of the present disclosure, the list includes different interests for different parties.

According to still another aspect of the present disclosure, the list includes multiple applications by which the party can be contacted.

According to yet another aspect of the present disclosure, the list includes different applications by which different parties can be contacted.

According to another aspect of the present disclosure, the communication is pushed to the party independent of any telephone number or email address of the party.

According to still another aspect of the present disclosure, the method includes obtaining authorization from the party to launch a call to the device, and calling the device.

According to an aspect of the present disclosure, a tangible computer readable storage medium stores a computer program. When executed by a processor, the computer program causes a computer apparatus to perform a process that includes detecting the presence of a party on a device in real time. Identity of the party is confirmed based on detecting the presence of the party on the device in real time. Information to offer to the party is identified based on confirming identity of the party. A communication is pushed to the party on the device as a push communication in real time while the party is still present on the device. The information in the push communication is offered while the party is still present on the device.

According to an aspect of the present disclosure, a computer apparatus includes a memory that stores instructions, and a processor that executes the instructions. When executed by the processor, the instructions cause the processor to perform operations including detecting the presence of a party on a device in real time. Identity of the party is confirmed based on detecting the presence of the party on the device in real time. Information to offer to the party is identified based on confirming identity of the party. A communication is pushed to the party on the device as a push communication in real time while the party is still present on the device. The information in the push communication is offered while the party is still present on the device.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to make or use the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of presenting information over a communications network, comprising:

searching, via a processor, across a plurality of wireless communication networks for a network presence of a target user, among a plurality of users;

detecting, via the processor, the network presence of a user based on whether a rate of data being transmitted in a detected wireless communication performed on a device is lower than a reference threshold greater than zero;

identifying, with the processor, that the user for which the network presence is detected is the target user;

transmitting, to an agent device, the detected network presence of the target user;

monitoring the wireless communications network for continued presence of the target user;

detecting the continued presence of the target user on the device by confirming that the target user is actively communicating, in real time, on a network application with the device;

when the continued presence of the target user is detected, identifying product information to offer to the target user, based on the identity of the target user; and receiving, from the agent device and via the wireless communication network, a push communication to the target user on the device in real time while the continued presence of the target user is detected,
wherein the network presence of the user is detected based on cookies received from a web server.

2. The method of claim 1,
wherein the product information is for an item to offer for sale to the target user and the item is identified after confirming the identity of the target user.

3. The method of claim 1,
wherein the wireless communication networks comprises a WiFi network.

4. The method of claim 1,
wherein the network application is installed on behalf of the target user on the device.

5. The method of claim 1,
wherein the network presence on the device is determined by an operating system of the device.

6. The method of claim 1,
wherein the network presence on the device is determined by a communications system that intermediates at least one of the wireless communication networks with a wired broadband network.

7. The method of claim 1,
wherein the push communication is transmitted to the device using web real time communications.

8. The method of claim 7,
wherein the push communication is pushed to the device through a browser session on the device.

9. The method of claim 8,
wherein the browser session is open on the device before the network presence of the target user is detected on the device.

10. The method of claim 9,
wherein the network presence of the target user is detected on the device based on the browser session being open.

11. The method of claim 1, wherein
the reference threshold is adjusted according to characteristics of the target user.

12. The method of claim 1, further comprising:
obtaining a list of users, including the target user, who have their network presence detected in real time on their respective devices.

13. The method of claim 12,
wherein the list includes different interests for different users.

14. The method of claim 12,
wherein the list includes multiple applications by which a user is to be contacted.

15. The method of claim 12,
wherein the list includes different applications by which different users are to be contacted.

16. The method of claim 1,
wherein the push communication is transmitted to the target user independent of any telephone number or email address of the target user.

17. The method of claim 1, further comprising:
obtaining authorization from the target user to launch a call to the device; and
calling the device.

18. The method of claim 1, wherein the product information is based on previous purchase data of the target user, interest data of the target user, and relationship data of the target user,
wherein the interest data of the target user comprises entertainment attendance information of the target user, and
wherein the relationship data comprises data reflective of other persons who have a relationship with the target user, including data obtained from a government.

19. A non-transitory computer readable storage medium that stores a computer program, the computer program, when executed by a processor, causing a computer apparatus to perform a process comprising:
searching across a plurality of wireless communication networks for a network presence of a target user, among a plurality of users;
detecting the network presence of a user based on whether a rate of data being transmitted in a detected wireless communication performed on a device is lower than a reference threshold greater than zero;
identifying that the user for which the network presence is detected is the target user;
transmitting, to an agent device, the detected network presence of the target user;
monitoring the wireless communication networks for continued presence of the target user;
detecting the continued presence of the target user on the device by confirming that the target user is actively communicating, in real time, on a network application with the device;
when the continued presence of the target user is detected, identifying product information to offer to the target user, based on the identity of the target user; and
receiving, from the agent device, a push communication to the target user on the device in real time while the continued presence of the target user is detected,
wherein the network presence of the user is detected based on cookies received from a web server.

20. A computer apparatus, comprising:
a processor;
a memory that stores executable instructions that, when executed by the processor, cause the processor to perform operations comprising:
wherein, when executed by the processor, the instructions cause the processor to perform operations comprising:
searching across a plurality of wireless communication networks for a network presence of a target user, among a plurality of users;
detecting the network presence of a user based on whether a rate of data being transmitted in a detected wireless communication performed on a device is lower than a reference threshold greater than zero;
identifying that the user for which the network presence is detected is the target user;
transmitting, to an agent device, the detected network presence of the target user;
monitoring the wireless communication networks for continued presence of the target user;
detecting the continued presence of the target user on the device by confirming that the target user is actively communicating, in real time, on a network application with the device;
when the continued presence of the target user is detected, identifying product information to offer to the target user, based on the identity of the target user; and
receiving, from the agent device, a push communication to the target user on the device in real time while the continued presence of the target user is detected, wherein the network presence of the user is detected based on cookies received from a web server.

* * * * *

UNITED STATES PATENT AND TRADEMARK OFFICE
CERTIFICATE OF CORRECTION

PATENT NO. : 10,193,837 B2
APPLICATION NO. : 14/568575
DATED : January 29, 2019
INVENTOR(S) : Foladare et al.

Page 1 of 1

It is certified that error appears in the above-identified patent and that said Letters Patent is hereby corrected as shown below:

In the Claims

Column 21, Line 12 (Claim 3) please change "networks comprises" to -- networks comprise --

Signed and Sealed this
Eighteenth Day of June, 2019

Andrei Iancu
*Director of the United States Patent and Trademark Office*